(12) United States Patent
Castro et al.

(10) Patent No.: US 12,122,639 B2
(45) Date of Patent: Oct. 22, 2024

(54) MOBILE INTERFACE, COMMUNICATION, AND CONTROL SYSTEM TO FACILITATE OPERATION OF ELEVATOR CARS WITH MEDIA OPTIONS

(71) Applicant: Otis Elevator Company, Farmington, CT (US)

(72) Inventors: Cuauhtemoc Castro, Florence, SC (US); Patricia Derwinski, Farmington, CT (US); Nicholas N. Fraser, Florence, SC (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 986 days.

(21) Appl. No.: 16/591,880

(22) Filed: Oct. 3, 2019

(65) Prior Publication Data

US 2021/0101778 A1    Apr. 8, 2021

(51) Int. Cl.
*B66B 1/34* (2006.01)
*B66B 1/28* (2006.01)
(Continued)

(52) U.S. Cl.
CPC .............. *B66B 1/3461* (2013.01); *B66B 1/28* (2013.01); *B66B 3/002* (2013.01); *B66B 3/008* (2013.01);
(Continued)

(58) Field of Classification Search
CPC .................. B66B 1/468; B66B 1/3461; B66B 2201/4653; B66B 5/0018;
(Continued)

(56) References Cited

U.S. PATENT DOCUMENTS 9,998,581 B1 *   6/2018   Noxon ..................... H04W 4/80
2018/0287970 A1  10/2018  Baldi et al.
(Continued)

FOREIGN PATENT DOCUMENTS

| CN | 106365002 A | 2/2017 |
| CN | 108689266 A | 10/2018 |

(Continued)

OTHER PUBLICATIONS

Chinese Office Action for Application No. 20211054597.X; dated May 25, 2022; 8 Pages.

(Continued)

*Primary Examiner* — Marlon T Fletcher
(74) *Attorney, Agent, or Firm* — CANTOR COLBURN LLP (57) ABSTRACT

An elevator interface, communication, and control system including: a first elevator car configured to move through a first elevator shaft, the first elevator car including elevator doors configured to open and close; a first controller in electronic communication with the first elevator car; a conversion module in electronic communication with the first controller; and a first wireless access point in electronic communication with the conversion module through a hard-wired connection, the first wireless access point being configured to wirelessly receive a first command from a first mobile computing device via a wireless protocol, wherein the first wireless access point is configured to transmit the first command to the conversion module, the conversion (Continued)

module is configured to transmit the first command to the first controller, and the first controller is configured to transmit the first command to the first elevator car.

12 Claims, 5 Drawing Sheets

(51) Int. Cl.
  *B66B 3/00* (2006.01)
  *B66B 11/02* (2006.01)
  *B66B 13/14* (2006.01)
  *G06F 3/14* (2006.01)
  *G06F 3/04847* (2022.01)
  *H04W 84/12* (2009.01)
  *H04W 88/08* (2009.01)

(52) U.S. Cl.
  CPC .......... *B66B 11/0213* (2013.01); *B66B 13/14* (2013.01); *G06F 3/14* (2013.01); *B66B 2201/30* (2013.01); *G06F 3/04847* (2013.01); *H04W 84/12* (2013.01); *H04W 88/08* (2013.01)

(58) Field of Classification Search
  CPC ...... B66B 2201/103; B66B 2201/4615; B66B 3/002; B66B 2201/4638; B66B 1/3446; B66B 1/3415; B66B 2201/306
  See application file for complete search history.

(56) References Cited

U.S. PATENT DOCUMENTS

| | | | |
|---|---|---|---|
| 2020/0339385 A1* | 10/2020 | Michaelidis | B66B 5/0037 |
| 2021/0087016 A1* | 3/2021 | Pahlke | B66B 1/3461 |
| 2021/0101778 A1* | 4/2021 | Castro | B66B 13/143 |

FOREIGN PATENT DOCUMENTS

| | | | | |
|---|---|---|---|---|
| CN | 112607533 A | * | 4/2021 | B66B 1/28 |
| DE | 102018211776 A1 | * | 1/2020 | |
| EP | 3231754 A1 | | 10/2017 | |
| EP | 3301057 A1 | | 4/2018 | |
| EP | 3381854 A1 | | 10/2018 | |
| JP | 2018111606 A | * | 7/2018 | B66B 1/3423 |
| KR | 20180083808 A | * | 7/2018 | |
| KR | 20180083815 A | * | 7/2018 | |
| WO | 02066358 A1 | | 8/2002 | |
| WO | 2017016878 A1 | | 2/2017 | |
| WO | 2018224426 A1 | | 12/2018 | |

OTHER PUBLICATIONS

European Search Report for Application No. 20199902.6, Issued Jun. 22, 2023, 5 Pages.
European Search Report for Application No. 20199902.6, Issued Mar. 12, 2021, 9 Pages.
European Search Report for Application No. 20199902.6, Issued Apr. 22, 2024, 5 Pages.
Chinese Office Action for Application No. 20211054597.X; Issued Jun. 21, 2024; 8 Pages.

* cited by examiner

MOBILE INTERFACE, COMMUNICATION, AND CONTROL SYSTEM TO FACILITATE OPERATION OF ELEVATOR CARS WITH MEDIA OPTIONS

BACKGROUND

The embodiments herein relate to the field of elevator systems, and specifically to a method and apparatus for secure wireless communication with an elevator system.

Control of elevator systems by an elevator attendant or building operations personnel typically requires the elevator attendant to push elevator call buttons located on a wall of the elevator bank. Varying selection of media content for the passengers riding the elevator is not integrated with elevator dispatching by the attendant

BRIEF SUMMARY

According to an embodiment, an elevator interface, communication, and control system is provided. The elevator interface, communication, and control system including: a first elevator car configured to move through a first elevator shaft, the first elevator car including elevator doors configured to open and close; a first controller in electronic communication with the first elevator car; a conversion module in electronic communication with the first controller; and a first wireless access point in electronic communication with the conversion module through a hardwired connection, the first wireless access point being configured to wirelessly receive a first command from a first mobile computing device via a wireless protocol, wherein the first wireless access point is configured to transmit the first command to the conversion module, the conversion module is configured to transmit the first command to the first controller, and the first controller is configured to transmit the first command to the first elevator car.

In addition to one or more of the features described herein, or as an alternative, further embodiments may include that the hardwired connection is a primary fiber optic cable.

In addition to one or more of the features described herein, or as an alternative, further embodiments may include that the wireless protocol is Wi-Fi.

In addition to one or more of the features described herein, or as an alternative, further embodiments may include that the first mobile computing device is a tablet computer or a smart watch.

In addition to one or more of the features described herein, or as an alternative, further embodiments may include that the first mobile computing device is configured to display parameters of the elevator interface, communication, and control system.

In addition to one or more of the features described herein, or as an alternative, further embodiments may include that the elevator doors open or close in response to the first command.

In addition to one or more of the features described herein, or as an alternative, further embodiments may include a display device located in the first elevator car, wherein the display device is adjusted in response to the first command.

In addition to one or more of the features described herein, or as an alternative, further embodiments may include: a second wireless access point in electronic communication with the conversion module through the hardwired connection, the second wireless access point being configured to wirelessly receive a second command from a second mobile computing device via the wireless protocol, wherein the second wireless access point is configured to transmit the second command to the conversion module, the conversion module is configured to transmit the second command to the first controller, and the first controller is configured to transmit the second command to the first elevator car.

In addition to one or more of the features described herein, or as an alternative, further embodiments may include that the first wireless access point and the second wireless access point are located at a lower boarding station, wherein the first wireless access point is located at a first lower landing of the lower boarding station and the second wireless access point is located at a second lower landing of the lower boarding station, the second lower landing being above the first lower landing.

In addition to one or more of the features described herein, or as an alternative, further embodiments may include that the first wireless access point is located at a lower boarding station and the second wireless access point is located at an upper boarding station.

In addition to one or more of the features described herein, or as an alternative, further embodiments may include a third wireless access point in electronic communication with the conversion module through the hardwired connection, the third wireless access point being configured to wirelessly receive a third command from a third mobile computing device via the wireless protocol, wherein the third wireless access point is configured to transmit the third command to the conversion module, the conversion module is configured to transmit the third command to the first controller, and the first controller is configured to transmit the third command to the first elevator car.

In addition to one or more of the features described herein, or as an alternative, further embodiments may include a fourth wireless access point in electronic communication with the conversion module through the hardwired connection, the fourth wireless access point being configured to wirelessly receive a fourth command from a fourth mobile computing device via the wireless protocol, wherein the fourth wireless access point is configured to transmit the fourth command to the conversion module, the conversion module is configured to transmit the fourth command to the first controller, and the first controller is configured to transmit the fourth command to the first elevator car.

In addition to one or more of the features described herein, or as an alternative, further embodiments may include that the first wireless access point and the second wireless access point are located at a lower boarding station, wherein the first wireless access point is located at a first lower landing of the lower boarding station and the second wireless access point is located at a second lower landing of the lower boarding station, the second lower landing being above the first lower landing.

In addition to one or more of the features described herein, or as an alternative, further embodiments may include that the third wireless access point and the fourth wireless access point are located at an upper boarding station, wherein the third wireless access point is located at a third lower landing of the upper boarding station and the fourth wireless access point is located at a fourth lower landing of the upper boarding station, the fourth lower landing being above the third lower landing.

In addition to one or more of the features described herein, or as an alternative, further embodiments may include that the elevator car includes an upper deck and a lower deck.

In addition to one or more of the features described herein, or as an alternative, further embodiments may include: a second elevator car configured to move through a second elevator shaft, the second elevator car including elevator doors configured to open and close; and a second controller in electronic communication with the second elevator car, the conversion module being in electronic communication with the second controller, wherein the first wireless access point being configured to wirelessly receive a second command from the first mobile computing device via the wireless protocol, wherein the first wireless access point is configured to transmit the second command to the conversion module, the conversion module is configured to transmit the second command to the second controller, and the second controller is configured to transmit the second command to the second elevator car.

According to another embodiment, a method of operating an elevator interface, communication, and control system for an elevator system, the method including: receiving, using a first access point, a first command from a first mobile computing device via a wireless protocol; transmitting the first command from the first access point to a conversion module through a hardwired connection; transmitting the first command from the conversion module to a first controller; and transmitting the first command from the first controller to a first elevator car configured to move through a first elevator shaft, the first elevator car including elevator doors configured to open and close.

In addition to one or more of the features described herein, or as an alternative, further embodiments may include: opening or closing the elevator doors in response to the first command.

In addition to one or more of the features described herein, or as an alternative, further embodiments may include: adjusting a display device in the first elevator car in response to the first command.

In addition to one or more of the features described herein, or as an alternative, further embodiments may include: displaying parameters of the elevator control, communication, and entertainment system on the first mobile computing device.

Technical effects of embodiments of the present disclosure include interfacing to an elevator car, communicating with the elevator car, and controlling the elevator car via a dedicated wireless access point on the landing that is hardlined directly to an elevator controller of the elevator car.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
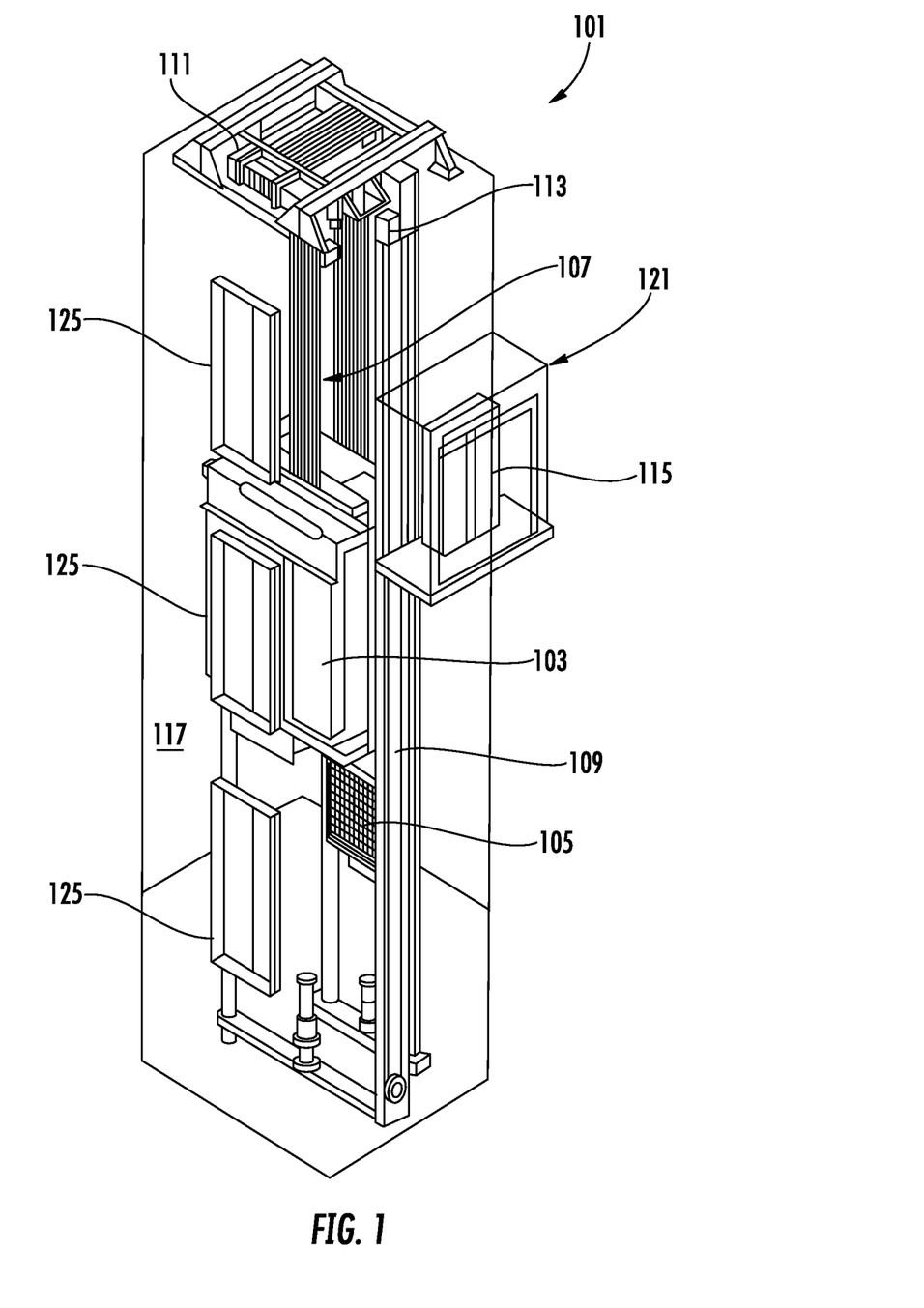
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Although shown and described with a single deck elevator car 103, elevator systems that employ a multiple deck elevator car 103 may employ embodiments of the present disclosure. For example, embodiments may be employed in double deck elevator systems that employ double deck elevator cars. FIG. 1 is merely a non-limiting example presented for illustrative and explanatory purposes.

Figure 2:
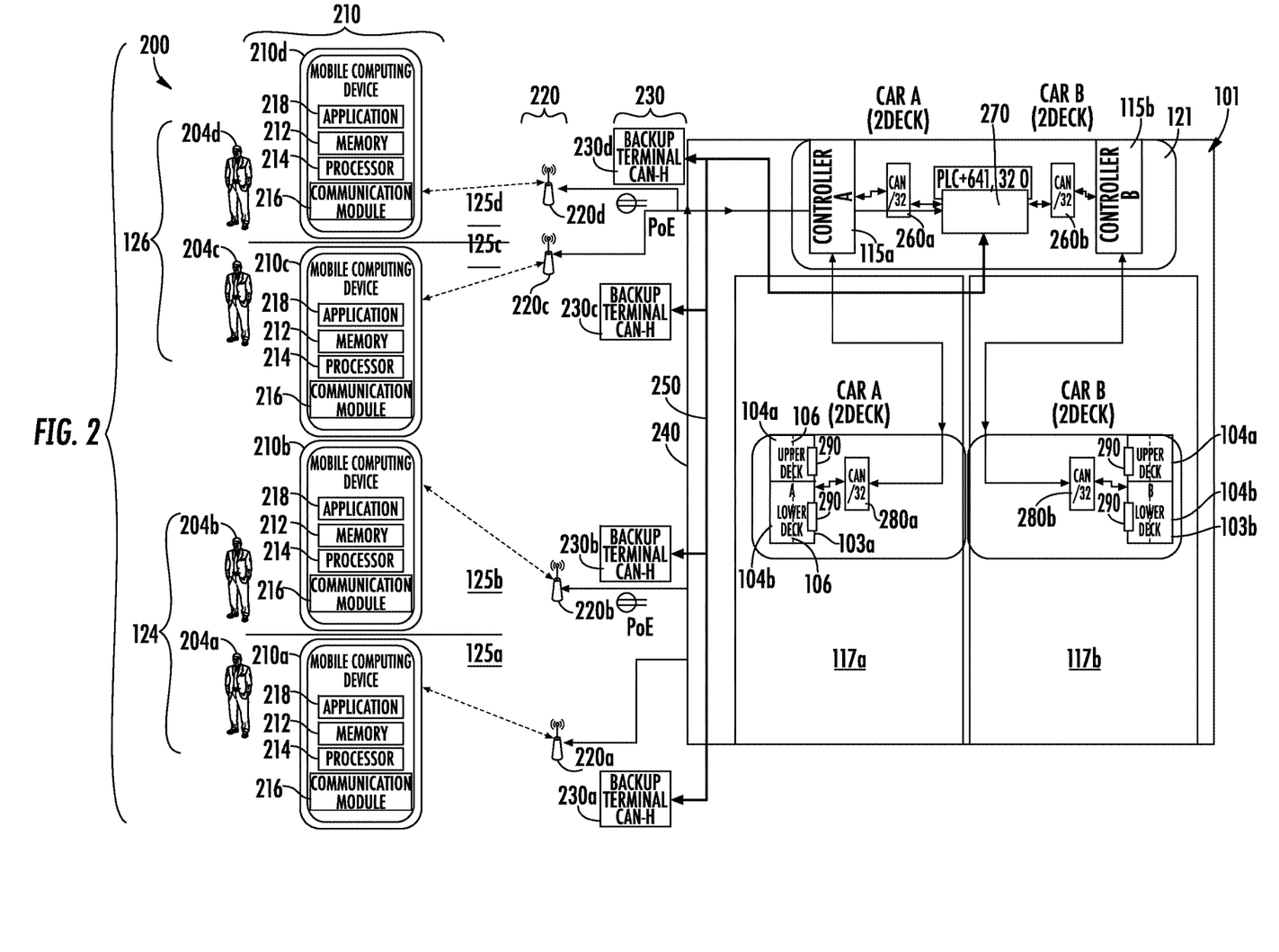
FIG. 2 is a schematic illustration of an elevator interface, communication, and control system for the elevator system of FIG. 1, in accordance with an embodiment of the disclosure.

Referring now to FIG. 2, with continued referenced to FIG. 1, a view of an elevator interface, communication, and control system 200 for use with and controlling the elevator system 101 of FIG. 1 is illustrated, according to an embodiment of the present disclosure. It should be appreciated that, although particular systems are separately defined in the schematic block diagrams, each or any of the systems may be otherwise combined or separated via hardware and/or software.

As illustrated in FIG. 2, the elevator system 101 is a multi-shaft elevator system including a first elevator shaft 117a and a second elevator shaft 117b. It should also be appreciated that, although the elevator system 101 illustrates an elevator system having two elevator shafts 117, embodiments disclosed herein are also applicable to elevator systems having one or more elevator shafts 117. A first elevator car 103a travels within the first elevator shaft 117a and a second elevator car 103b travels within a second shaft 117b.

As illustrated in FIG. 2, the elevator system 101 includes two elevators cars 103a, 103b that each have an upper deck 104a and a lower deck 104b. In other words, the elevator cars 103a, 103b of FIG. 2 are double deck. It should also be appreciated that, although the elevator system 101 illustrates elevator cars 103a, 103b that are double deck, embodiments disclosed herein are also applicable to elevator cars 103 that are single deck.

The first elevator car 103a is electrically connected to a first controller 115a through a serial communication bus 280a. The controller 115a is configured to control operation of the first elevator car 103a through the serial communication bus 280a. For example, the controller 115 may control opening and closing of elevator doors 106 of the upper deck 104a of the first elevator car 103a and elevator doors 106 of the lower deck 104b of the first elevator car 103a. A display device 290 may be present in each of the upper deck 104a and the lower deck 104b. The display device 290 may be a computer monitor, television monitor, projection, projector, assortment of lights, illuminated sign, or any other visual display device known to one of skill in the art. The first controller 115a is electrically connected to the display device 290 through the serial communication bus 280a and configured to control operation of the display device 290. For example, the display device 290 may be a television configured to display a movie to passengers of the first elevator car 103a. The first controller 115a is electronically connected to a conversion module 270 through a serial communication bus 260a. The conversion module 270 is configured to receive commands and translate them so that the first controller 115a can read the commands. The conversion module 270 is converting from the elevator controller language specific predefined items to the mobile computing device protocol. These pre-defined items eliminate placement or translation of the elevator system internal communication into the mobile computing device language/protocol and advantageously this is one of the cyber security features. The conversion module 270 converts both ways. It converts the requests from the mobile computing device protocol that is used by the attendants to requests for the elevators system 101 and it converts from the elevator controllers information to the mobile computing device protocol. It should be appreciated that, although particular systems are separately defined in the schematic block diagrams, each or any of the systems may be otherwise combined or separated via hardware and/or software. For example, the conversion module 270 may be combined into one or more other components described herein.

The second elevator car 103b is electrically connected to a second controller 115b through a Serial communication bus 280b. The controller 115a is configured to control operation of the second elevator car 103b through the Serial communication bus 280b. For example, the controller 115 may control opening and closing of elevator doors 106 of the upper deck 104a of the second elevator car 103b and elevator doors 106 of the lower deck 104b of the second elevator car 103b. A display device 290 may be present in each of the upper deck 104a and the lower deck 104b. The display device 290 may be a computer monitor, television monitor, projection, projector, assortment of lights, illuminated sign, or any other visual display device known to one of skill in the art. The second controller 115b is electrically connected to the display device 290 through the Serial communication bus 280b and configured to control operation of the display device 290. For example, the display device 290 may be a television configured to display a movie to passengers of the second elevator car 103b. The second controller 115b is electronically connected to a conversion module 270 through a Serial communication bus 260b. The conversion module 270 is configured to receive, interpret, and transmit commands so that the second controller 115b can read the commands.

The conversion module 270 may be located in the controller room 121 (e.g., machine room) along with the first controller 115a and the second controller 115b. The conversion module 270 may be an electronic controller including a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium. The conversion module 270 is also configurable by software, so it can be changed or modified to add additional communication and/or functions in both directions, if the specification from the customer changes on the information that is wanted for the operators or the operator inputs.

The commands received by the conversion module 270 may be from either a wireless access point 220 or a backup terminal 230. The conversion module 270 is in electronic communication with one or more wireless access points 220 through a hardwired connection, such as, a primary fiber optic cable 240. The conversion module 270 is in electronic communication with one or more backup terminals 230 through a hardwired connection, such as, a secondary fiber optic cable 250 or a CAN or other serial connection. The wireless access points 220 (e.g., wireless router) may serve as the primary means of receiving commands to be sent to the conversion module 270 and the backup terminals 230 may serve as a secondary means of receiving commands to be sent to the conversion module 270, such as, for example, if the wireless access points 220 were to fail. The wireless access point 220 also communicates parameters 400 (see FIG. 4) of the elevator interface, communication, and control system 200 to mobile computing devices 210 and the parameters (see FIG. 4) may be displayed on the mobile computing devices 210. The backup terminal 230 may be a data entry point such as, for example, a key pad, touch screen button, microphone, joystick, buttons, LEDs, key switches, or similar device known to one of skill in the art.

The wireless access point 220 is a local wireless receiver configured to receive commands wirelessly from mobile computing devices 210. The wireless access point 220 is powered by power over Ethernet. Alternatively, the wireless access point 220 may be powered by local power (e.g., 110V) or a battery. The mobile computing devices 210 may be configured to wirelessly transmit commands to the wireless access points 220 via one or more wireless protocols. The wireless protocols may include Wi-Fi, Bluetooth, ZigBee, Z-Wave, or similar wireless protocol known to one of skill in the art. In an embodiment, the wireless protocol is Wi-Fi.

Also shown in FIG. 2 is a mobile computing device 210a-d. The mobile computing device 210 may be used by an elevator attendant 204a-d. The mobile computing device 210 is configured to allow the elevator attendant 204 to control operation of the elevator cars 103a, 103b by submitting commands via the mobile computing device 210 and receive information on the mobile computing device 210 of the status and configuration. The mobile computing device 210 may be a smart phone, PDA, smart watch, tablet computer, laptop, etc. In an embodiment, the mobile computing device 210 is a tablet computer, smart phone, or smart watch. The mobile computing device 210 is illustrated in FIG. 2 as a tablet but it is understood that the embodiments disclosed herein may be applicable to other devices that would allow an elevator attendant 204 to submit commands and receive notification from elevator systems of the elevator system 101 status.

The mobile computing device 210 may include a processor 214, memory 212, a communication module 216, and an application 218, as shown in FIG. 2. The processor 214 can be any type or combination of computer processors, such as a microprocessor, microcontroller, digital signal processor, application specific integrated circuit, programmable logic device, and/or field programmable gate array. The memory 212 is an example of a non-transitory computer readable storage medium tangibly embodied in the mobile computing device 210 including executable instructions stored therein, for instance, as firmware. The communication module 216 may implement one or more communication protocols, such as, for example, Wi-Fi, Bluetooth, ZigBee, Z-Wave, or similar wireless protocol known to one of skill in the art. The communication module 216 is in wireless electronic communication with the wireless access points 220.

The application 218 may be computer software installed directly on the memory 212 of the mobile computing device 210 and/or installed remotely and accessible through the mobile computing device 210 (e.g., software as a service or a web app). The application 218 is configured to generate a graphical user interface on the mobile computing device 210 that allows for entry of a command by the elevator attendant 204 and allows the attendant 204 to learn status functions of the elevator cars 101 in the group. The application 218 is configured to allow entry of commands from the elevator attendant 204 to control the elevator car 103 via a user input on the mobile computing device. A user input may be a touch, tap, click, voice command, etc. In one example, the commands may instruct the elevator car 103 to open or close doors 106. In another example, the commands may instruct the controller 115 that the elevator car 103 is ready to begin motion. In another example, the commands may instruct the display device 290 to begin playing a movie, music, text, or other media content. Thus, the display device 290 is adjusted (e.g., turned on, movie activated, etc.) in response to the command. Alternatively, the elevator system 101 will be able to provide information to the attendant so that they know what is going on (e.g., where is the elevator, is it traveling or loading passengers at the other end of the building, is it running at a slow speed due to other conditional criteria not associated with the observatory like building sway operation, is it out of service because the owner shut down one of the decks because a monitor is broken).

The communication module 216 is configured to transmit the command to the wireless access point 220 and the wireless access point relays that command to the conversion module 270, which decides which elevator car 103 the command was intended for and then the conversion module 270 interprets and transmits the command to the elevator car 103 and elevator controller 115 that the command was intended for.

The elevator system 101 of FIG. 2 is configured to transport passengers from a lower boarding station 124 to an upper boarding station 126. Since the elevator system 101 of FIG. 2 is a double deck elevator system the lower boarding station 124 includes a first lower landing 125a and a second lower landing 125b above the first lower landing 125a. Also, the upper boarding station 126 includes a first upper landing 125c and a second upper landing 125d above the first upper landing 125c. In an example, the lower boarding station 124 may be a lower landing where passengers enter the elevator cars 103 to get to an observatory deck and the upper boarding station 126 may be the observatory deck where passengers disembark the elevator cars 103 to enjoy the view or ride an amusement park ride.

An elevator attendant 204 may be located on each landing 125 for the lower boarding station 124 and the upper boarding station 126. For example, a first elevator attendant 204a may be located on the first lower landing 125a, a second elevator attendant 204b may be located on the second lower landing 125b, a third elevator attendant 204c may be located on the first upper landing 125c, and a fourth elevator attendant 204d may be located on the second upper landing 125d. Each elevator attendant 204 is given a mobile computing device 210 to control the upper deck 104a or the lower deck 104b of the elevator car 103 when at their respective landing 125. For example, the first elevator attendant 204a on the first lower landing 125a may have a first mobile computing device 210a, the second elevator attendant 204b on the second lower landing 125b may have a second mobile computing device 210b, the third elevator attendant 204c on the first upper landing 125c may have a third mobile computing device 210c, and the fourth elevator attendant 204d on the second upper landing 125d may have a fourth mobile computing device 210d. Any single attendant 204 may be communicating via a mobile computing device with more than one elevator car 103 in an elevator bank, or with elevators in different elevator banks as in the example of a sky lobby. Attendants 204 on different landings can receive and transmit status information to each other.

A wireless access point 220 may be located on each landing 125 for the lower boarding station 124 and the upper boarding station 126. For example, a first wireless access point 220a may be located on the first lower landing 125a, a second wireless access point 220b may be located on the second lower landing 125b, a third wireless access point 220c may be located on the first upper landing 125c, and a fourth wireless access point 220d may be located on the second upper landing 125d. The first mobile computing device 210a communicates with the first wireless access point 220a, the second mobile computing device 210b communicates with the second wireless access point 220b, the third mobile computing device 210c communicates with the third wireless access point 220c, and the fourth mobile computing device 210d communicates with the fourth wireless access point 220d.

A backup terminal 230 may be located on each landing 125 for the lower boarding station 124 and the upper boarding station 126. For example, a first backup terminal 230a may be located on the first lower landing 125a, a second backup terminal 230b may be located on the second lower landing 125b, a third backup terminal 230c may be located on the first upper landing 125c, and a fourth backup terminal 230d may be located on the second upper landing 125d.

Figure 3:
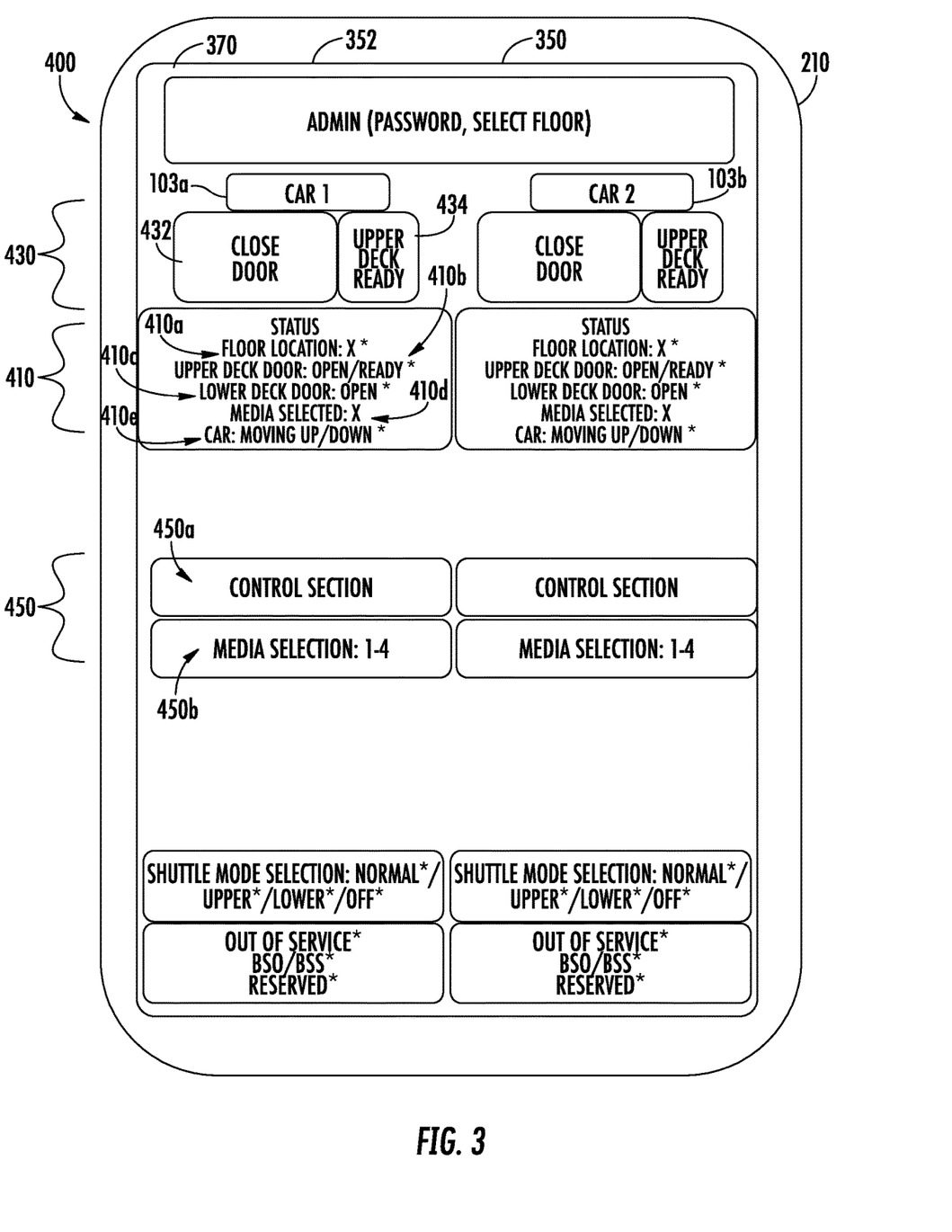
FIG. 3 is a schematic illustration of a graphical user interface for use with the communication system of FIG. 2, in accordance with an embodiment of the disclosure.
Figure 4:
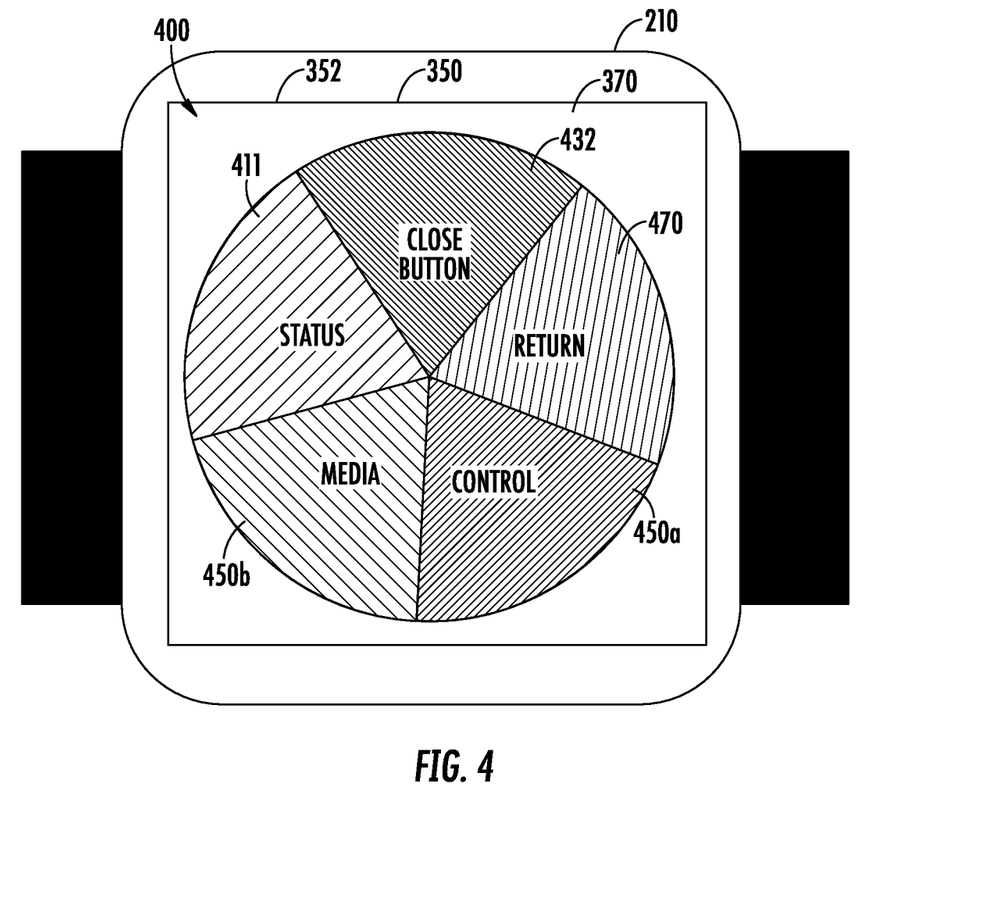
FIG. 4 is a schematic illustration of a graphical user interface for use with the communication system of FIG. 2, in accordance with an embodiment of the disclosure.

Referring now to FIGS. 3-4, with continued reference to FIGS. 1-2, a graphical user interface (GUI) 370, displayed on a display of the mobile computing device 210 is illustrated, in accordance with an embodiment of the present disclosure. FIGS. 3 and 4 illustrate a computing device 210 generating a GUI 370 via display device 350 for viewing parameters 400 of the elevator interface, communication, and control system 200. The GUI 370 displayed in FIGS. 3 and 4 may be adjusted to add additional elevator system information based on customer specifications. In FIG. 3, the GUI 300 is displayed on a display 310 of the mobile computing device 210 and the mobile computing device 210 may be a tablet computer or a smart phone. The computing device 300 includes an input device 352, such as, example, a mouse, a keyboard, a touch screen, a scroll wheel, a scroll ball, a stylus pen, a microphone, a camera, etc. In the example shown in FIG. 3, since the computing device 300 is a tablet computer or a touch screen smart phone, then the display device 350 also functions as an input device 352. In the example shown in FIG. 4, since the computing device 300 is a tablet computer or a touch screen smart watch, then the display device 350 also functions as an input device 352. FIGS. 3 and 4 illustrates a GUI 370 generated on the display device 350 of the computing device 300. A user (e.g., elevator attendant) may interact with the graphical user interface 370 through a selection input, such as, for example, a "click", "touch", verbal command, gesture recognition, or any other input to the user interface 370. The user (e.g., elevator attendant) may also receive elevator system 101 information via the GUI 370.

The display device 350 may be large enough to display parameters 400 of the elevator interface, communication, and control system 200 for multiple elevator cars 103 (e.g., first elevator car 103a and first elevator car 103b) simultaneously, as shown in FIG. 3. The parameters 400 may include status information 410, elevator operation controls 430, and elevator media controls 450. For example, as shown in FIG. 3, the elevator operation controls 430 may include a close door icon 432, that the elevator attendant may select through a user input to close the door 106 of the elevator car 103 of the elevator deck 104a, 104b that is located at the landing of the elevator attendant. The elevator operation controls 430 may include a status icon 434 of the elevator deck that is not located at the floor of the elevator attendant. For example, the status icon 434 may display "upper deck ready" on the computing device 210 of an elevator attendant that is on the landing where the lower deck 104b is located, so that the elevator attendant is aware what is going on with the upper deck 104a of the elevator car 103. The status information may include but is not limited to floor or landing location 410a, upper deck door status 410b, lower deck door status 410c, current media selection 410d, and car movement status 410e. The elevator media controls 450 may include but are not limited configuring the mobile computing device 210, setting access, displays, user id or password information on the mobile device, initializing and verification of show equipment startup routines, and selecting different media options 450b. An elevator attendant may select various media options via a user input on the media selection icon 450b to display different movies or informational screens on the display device 290 within the elevator car 103.

In the example illustrated in FIG. 4, the display device 350 is smaller than in FIG. 3 because the display device 350 is located on a smart watch. Since, the display device 350 of FIG. 4 is small enough to fit on a smart watch, then the GUI 370 may display parameters 400 for a single elevator car 103, as shown in FIG. 4. For example, as shown in FIG. 4, the GUI 370 may display a close door icon 432, that the elevator attendant may select through a user input to close the door 106 of the elevator car 103 of the elevator deck 104a, 104b that is located at the landing of the elevator attendant. The GUI 370 may include a status information icon 411 that the elevator attendant may select to view information similar to the status information 410 displayed in FIG. 3. An elevator attendant may select various media options via a user input on the media selection icon 450b to display different movies on the display device 290 within the elevator car 103.

The control icon 450a may be utilized in two levels of control in the GUI 370 and work in association with the return icon 470. For example, one level of control may be a high level that includes settings for the landing 125 where the mobile computing device 210 is currently located or a user password and the ability to select an elevator car 103 to control, which is not shown in FIG. 4. Another level of controls may be one level down, as shown in FIG. 4, which may be based on controls for each car 103, such as, for example, the media being displaying in the elevator car 103. The return icon 470 may return an attendant 204 using the mobile computing device 210 to one level up in the GUI 370, where the attendant 204 can select the elevator car 103 they want to control.

Figure 5:
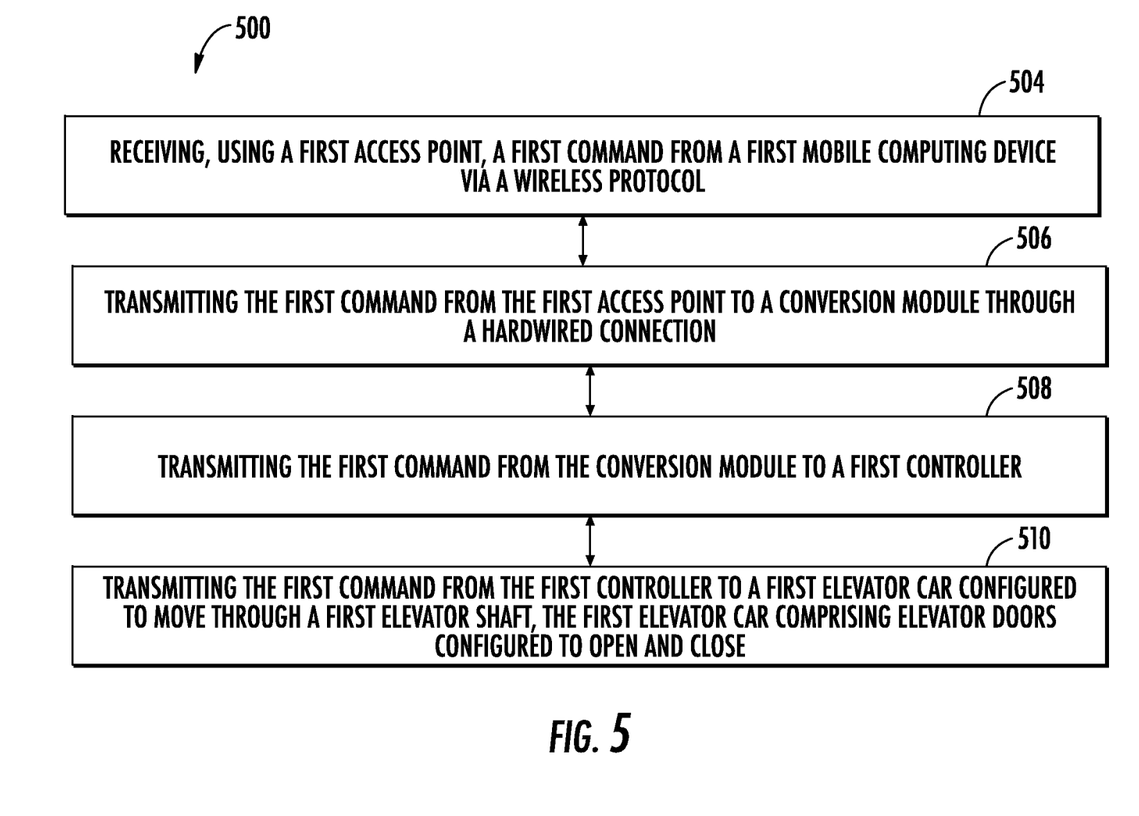
FIG. 5 illustrates a flow chart a method for communicating with and controlling an elevator system using the communication system of FIG. 2, in accordance with an embodiment of the disclosure.

Referring now to FIG. 5, with continued reference to FIGS. 1-4. FIG. 5 shows a flow chart of a method 500 for communicating with and controlling an elevator system 101, in accordance with an embodiment of the present disclosure. In an embodiment, the method 500 is performed by the elevator interface, communication, and control system 200.

At block 504, a first command from a first mobile computing device is received via a wireless protocol using a first wireless access point 220a. At block 506, the first command is transmitted from the first wireless access point 220a to a conversion module 270 through a hardwired connection. In an embodiment, the hardwired connection is the primary fiber optic cable 240. At block 508, the first command is translated and transmitted from the conversion module 270 to a first controller 115a. At block 510, the first command is transmitted from the first controller 115a to a first elevator car 103a configured to move through a first elevator shaft 117a. The first elevator car 103a comprising elevator doors 105 configured to open and close.

The method 500 may also comprise: opening or closing the elevator doors 106 in response to the first command. The method 500 may further comprise: adjusting a display device 290 in the first elevator car 103a in response to the first command. Adjusting the display device 290 may include but is not limited to: turning on/off the display device 290, adjusting the volume of the display device 290, adjusting the brightness of the display device 290, adjusting the display device 290 itself in anyway, or selecting a different movie on the display device 290.

Advantageously, the adjustment to the display device 290 may be made in real time limited only by the speed of the signal traveling on the primary fiber optic cable 240 with no limitation due to using an external BUS or other communication method going through a general use internet system of a building housing the elevator system 101. While the above description has described the flow process of FIG. 5 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code (i.e., computer program product) containing instructions embodied in tangible media (e.g., non-transitory computer readable medium), such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments.

Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator interface, communication, and control system, comprising:
   a first elevator car configured to move through a first elevator shaft, the first elevator car comprising elevator doors configured to open and close;
   a first controller in electronic communication with the first elevator car;
   a conversion module in electronic communication with the first controller; and
   a first wireless access point in electronic communication with the conversion module through a hardwired connection, the first wireless access point being configured to wirelessly receive a first command from a first mobile computing device via a wireless protocol,
   wherein the first wireless access point is configured to transmit the first command to the conversion module, the conversion module is configured to transmit the first command to the first controller, and the first controller is configured to transmit the first command to the first elevator car;
   a second wireless access point in electronic communication with the conversion module through the hardwired connection, the second wireless access point being configured to wirelessly receive a second command from a second mobile computing device via the wireless protocol,
   wherein the second wireless access point is configured to transmit the second command to the conversion module, the conversion module is configured to transmit the second command to the first controller, and the first controller is configured to transmit the second command to the first elevator car;
   wherein the first wireless access point and the second wireless access point are located at a lower boarding station, wherein the first wireless access point is located at a first lower landing of the lower boarding station and the second wireless access point is located at a second lower landing of the lower boarding station, the second lower landing being above the first lower landing;

a display device located in the first elevator car, wherein media displayed on the display device is controlled in response to the first command;

a second display device located in the first elevator car, wherein media displayed on the second display device is controlled in response to the second command.

2. The elevator interface, communication, and control system of claim 1, wherein the hardwired connection is a primary fiber optic cable.

3. The elevator interface, communication, and control system of claim 1, wherein the wireless protocol is Wi-Fi.

4. The elevator interface, communication, and control system of claim 1, wherein the first mobile computing device is a tablet computer or a smart watch.

5. The elevator interface, communication, and control system of claim 1, wherein the first mobile computing device is configured to display parameters of the elevator interface, communication, and control system.

6. The elevator interface, communication, and control system of claim 1, wherein the elevator doors open or close in response to the first command.

7. The elevator interface, communication, and control system of claim 1, wherein the first wireless access point is located at a lower boarding station and the second wireless access point is located at an upper boarding station.

8. The elevator interface, communication, and control system of claim 1, further comprising:

a third wireless access point in electronic communication with the conversion module through the hardwired connection, the third wireless access point being configured to wirelessly receive a third command from a third mobile computing device via the wireless protocol, wherein the third wireless access point is configured to transmit the third command to the conversion module, the conversion module is configured to transmit the third command to the first controller, and the first controller is configured to transmit the third command to the first elevator car.

9. The elevator interface, communication, and control system of claim 8, further comprising:

a fourth wireless access point in electronic communication with the conversion module through the hardwired connection, the fourth wireless access point being configured to wirelessly receive a fourth command from a fourth mobile computing device via the wireless protocol, wherein the fourth wireless access point is configured to transmit the fourth command to the conversion module, the conversion module is configured to transmit the fourth command to the first controller, and the first controller is configured to transmit the fourth command to the first elevator car.

10. The elevator interface, communication, and control system of claim 9, wherein the third wireless access point and the fourth wireless access point are located at an upper boarding station, wherein the third wireless access point is located at a third lower landing of the upper boarding station and the fourth wireless access point is located at a fourth lower landing of the upper boarding station, the fourth lower landing being above the third lower landing.

11. The elevator interface, communication, and control system of claim 1, wherein the elevator car comprises an upper deck and a lower deck.

12. The elevator interface, communication, and control system of claim 1, further comprising:

a second elevator car configured to move through a second elevator shaft, the second elevator car comprising elevator doors configured to open and close; and a second controller in electronic communication with the second elevator car, the conversion module being in electronic communication with the second controller, wherein the first wireless access point being configured to wirelessly receive a second command from the first mobile computing device via the wireless protocol, wherein the first wireless access point is configured to transmit the second command to the conversion module, the conversion module is configured to transmit the second command to the second controller, and the second controller is configured to transmit the second command to the second elevator car.

* * * * *